United States Patent [19]

Fischer et al.

[11] Patent Number: 5,084,120
[45] Date of Patent: Jan. 28, 1992

[54] REMOVABLE OR HINGED COMPONENT FOR COVERING OPENINGS IN THE FUSELAGE OF AN AIRCRAFT

[75] Inventors: Josef Fischer, Ried im Innkreis; Walter A. Stephan, Braunau, both of Austria

[73] Assignee: Fischer Advanced Composite Components Gesellschaft m.b.H., Ried im Innkreis, Austria

[21] Appl. No.: 445,038

[22] Filed: Dec. 4, 1989

Related U.S. Application Data

[62] Division of Ser. No. 166,269, Mar. 10, 1988, Pat. No. 4,908,254.

[30] Foreign Application Priority Data

Mar. 10, 1987 [AT] Austria ................................. 561/87
Feb. 19, 1988 [AT] Austria ................................. 398/88

[51] Int. Cl.$^5$ ............................................. B32B 31/00
[52] U.S. Cl. ................................. 156/233; 156/247; 156/285; 29/17.3; 29/DIG. 44; 244/119; 244/123
[58] Field of Search ............... 428/119, 156, 120, 116, 428/178, 131, 179, 188, 174, 68, 76, 606, 607; 52/807, 793, 309.14, 309.13, 309.1, 806; 244/119, 123, 124, 125, 133, 120, 129.4, 129.5; 156/60, 84, 85, 182, 230, 233, 247, 285, 286; 427/350; 29/17.2, 17.3, DIG. 44

[56] References Cited

U.S. PATENT DOCUMENTS 3,995,080  11/1976  Cogburn et al. ................. 428/119
4,299,871  11/1981  Forsch ............................. 428/104

FOREIGN PATENT DOCUMENTS 835061  7/1949  Fed. Rep. of Germany.
1704670  2/1971  Fed. Rep. of Germany.
2424068  12/1974  Fed. Rep. of Germany.
2334132  1/1975  Fed. Rep. of Germany.
2642523  3/1978  Fed. Rep. of Germany.
3003552  8/1981  Fed. Rep. of Germany.
2418110  11/1985  Fed. Rep. of Germany.
3614618  11/1987  Fed. Rep. of Germany.

OTHER PUBLICATIONS

"der Plastverarbeiter", 1961, vol. 8, pp. 357-362.
"Glasfibre Reinforced Synthetic Resins", Springer Verlag, 1961, pp. 394-395.

Primary Examiner—Patrick J. Ryan
Assistant Examiner—Donald J. Loney
Attorney, Agent, or Firm—Fleit, Jacobson, Cohn, Price, Holman & Stern

[57] ABSTRACT

A component for cladding apertures in the fuselage of an aircraft is to be of lighter weight and more corrosion resistant as compared with known claddings. The component is manufactured of carbon fibre reinforced curable synthetic resin and comprises a base layer (2) onto which U-profiles (4, 4') and L-profiles (5, 5') are placed in spaced apart interrelationship, which during the manufacture are held in place by a grid (14) comprising angular bridge members. A vacuum foil 7 is applied over this assembly and is adhesively bonded along the edges of the base layer (2') to the supporting surface (1). The space between the vacuum foil (7) and the supporting surface (1) is evacuated and curing proceeds at an elevated temperature and pressure. After complete curing the vacuum foils (7) and the grid (14) are removed.

10 Claims, 2 Drawing Sheets

REMOVABLE OR HINGED COMPONENT FOR COVERING OPENINGS IN THE FUSELAGE OF AN AIRCRAFT

This is a divisional of application Ser. No. 07/166,269, filed Mar. 10, 1988 now U.S. Pat. No. 4,968,254.

BACKGROUND AND FIELD OF THE INVENTION

The invention relates to a removable or hinged component for covering apertures in the fuselage of an aircraft, e.g. covering or service ports for aggregates such as an auxiliary gas turbine or air-conditioning plant. In the case of failures and servicing of the aggregates, the covering must be capable of rapid removal. This involves usually self-supporting shells of large surface area which are fitted to the fuselage at only a few localities (e.g. hinges) and which are locked to one another or to the fuselage by fast-acting fasteners. These components are at present made of aluminium having a wall thickness of a few millimeters serving as outer layer and numerous reinforcement ribs for accommodating the closure forces, forces arising from the aerodynamic resistance of the cladding and of pressures resulting from malfunction of the installed aggregates (fire, explosion). On occasion composite materials comprising a light core and fibrous webs have also been employed. In order to save weight, the aluminium skin is of reduced wall thickness in localities of reduced load. For that purpose chemical etching is employed or one sheet is adhesively bonded onto a further sheet having cut-away regions.

GENERAL DESCRIPTION OF THE INVENTION

It is an object of the invention to provide a component for the cladding of apertures having a substantially reduced weight, as compared with known claddings and having corrosion-resistance, so that little or no maintenance is needed.

Further or alternative objects will become apparent from what follows.

According to the invention a component as set out in the opening paragraph comprises a base layer on which, spaced apart, a plurality of preferably mutually parallel U-profiles is provided, the base portions of which extend transversely to the base layer and one limb of which is flush with the base layer and that at the transition between the base layer and the base portion which faces away from the limb an L-profile is provided in each case, the base layer, U-profile and the L-profile being composed of fibre reinforced, e.g. carbon fibre reinforced fully cured synthetic resin.

In a first embodiment of the invention the limbs of at least some successive U-profiles are directed to face the limbs of an end profile.

In a second embodiment of the invention the limbs of adjoining U-profiles face each other.

In a third embodiment of the invention a cover layer is applied onto the free-standing limbs of the U-profiles, composed of fibre reinforced, e.g. carbon fibre reinforced fully cured synthetic resin.

The first process for manufacturing the component according to the first embodiment, according to the invention, provides that the base layer is applied onto a large area supporting surface having a configuration which in the longitudinal and transverse directions corresponds to the desired configuration of cladding for the aperture, that the U-profiles are applied unto the supporting surface, that thereafter the L-profiles are applied onto that side of the base portion of the inner U-profiles which faces away from the limbs, that onto the U-profiles a grid framed by a frame is applied which holds the U-profile and the L-profiles together, that in a manner known per se a vacuum foil is applied over the structure formed in that manner and is adhesively bonded along the edges of the base layer to the large area supporting surface, whereupon the space between the vacuum foil and the large area supporting surface is evacuated and complete curing takes place at elevated temperature and pressure, whereafter the vacuum foil and the grid are removed.

The second process for the manufacture of the component according to the second embodiment, in accordance with the invention, provides that the base layer is applied onto a large area supporting surface, the configuration of which corresponds in the longitudinal and transverse directions to the desired configuration of the cladding for the aperture, that onto a subsequently removable core of rectangular cross section on both sides of the narrow sides of the core the U-profiles are applied and the unit formed by the the U-profiles including the core is laid onto the base layer, the core being matched to the configuration of the large area supporting surface in the longitudinal direction, that subsequently the L-profiles are fitted on both sides of the U-profiles, that a vacuum foil is applied over the structure formed in the aforesaid manner and is adhesively bonded along the edges of the base layer to the large area supporting surface, whereafter the space between the vacuum foil and the large area supporting surface is evacuated and complete curing takes place at elevated temperature and pressure followed by the removal of the vacuum foil and the core.

The third process for the manufacture of the component according to the first or second embodiment in accordance with the invention provides that, after the production of the component according to the first or second embodiment a closed rubber bag having an inlet nipple is inserted into each of the spaces between the U-profiles, that a covering layer of fibre-reinforced curable plastics is applied onto the free-standing limbs of the U-profiles and a vacuum foil in the form of a bag is drawn over the entire assembly, the inlet nipples projecting from the vacuum foil and being adhesively bonded thereto in an airtight manner in the region of contact, whereafter the space between the vacuum foil and the rubber bags is evacuated, and a complete curing of the covering layer takes place at elevated temperature and pressure followed by the removal of the vacuum foil and the rubber bags.

Epoxy resin, phenolic resin or polyamide resin can be used as the plastics.

BRIEF DESCRIPTION OF THE DRAWINGS

Further features and details of the invention will in the following be explained with reference to the drawings. There is shown in FIG. 1 a first embodiment of the invention in cross section, FIG. 2, a diagrammatic view of a grid surrounded by a frame serving for the manufacture, FIG. 3, a second embodiment of the invention in cross section and FIG. 4 a third embodiment of the invention in cross section.

DESCRIPTION OF SPECIFIC EMBODIMENTS BY WAY OF EXAMPLE

Figure 1:
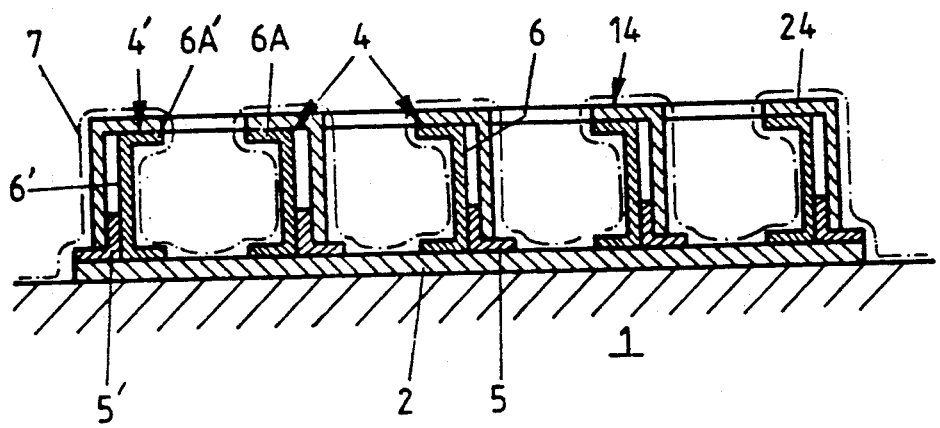
Figure 2:
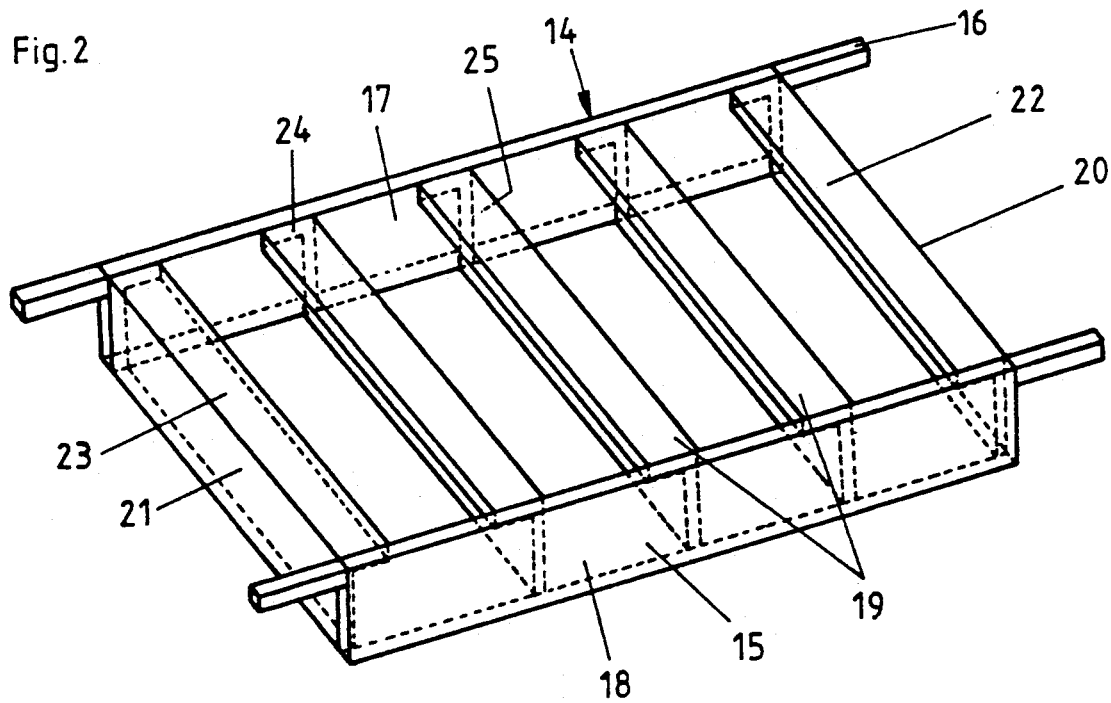

In FIG. 1, 1 denotes a large area supporting surface, the configuration of which in the longitudinal and transverse direction is adapted to the desired configuration of the cladding. In the illustrated example the supporting surface 1 extends rectilinearly in the transverse direction, whilst in the longitudinal direction it may for example be of circularly arcuate configuration. A base layer 2 of fibre reinforced curable synthetic resin is applied onto this supporting surface. The supporting surface 1 is coated with a suitable agent to avoid adherence of the base layer 2. Onto the base layer 2, in spaced apart relationship a plurality of U-profiles 4 are placed, the limbs 6a of which are directed to face the limbs 6A' of a terminal profile 4'. This is followed by the application of one L-profile 5 or 5' each of fibre reinforced curable synthetic resin along the transition between the base layer 2 and the base portion 6 of the U-profile 4 on that side of the base portion 6 or 6' which faces away from the limbs 6A. As shown in FIG. 1, a grid 14, which as illustrated in FIG. 2 is composed of a frame 15 with handles 16 and angular bridges 19 held between the longitudinal sides 17, 18, the transverse side 20, 21 being connected to struts 22, 23, is placed onto each of the U- and L-profiles 4, 4', 5, 5'. In the illustrated condition of use of the grid as shown in FIG. 1, the grid rests with its struts 22, 23 and the horizontal limbs 24 of the bridge members 19 on the upper limbs 6A, 6A' of the U-profiles 6, 6' and by means of the transverse struts 20, 21 as well as the vertical limbs 25 of the bridge members 19, it engages behind the L-profiles 5, 5' whereby the profiles 4, 5, 4', 5' are held in a fixed position on the base layer 2. A vacuum foil 7 is placed over the structure formed in that manner and is adhesively bonded along the edges of the base layer 2 onto the supporting surface 1. The space between the vacuum foil 7, the supporting surface 1, the grid 14, the base layer 2 and the profiles 4, 5, 4', 5' is then evacuated. This is followed by complete curing in an autoclave at a temperature of 120° to 315° C., preferably 160°-282° C. and more preferably 170°-200° C. and at a pressure of 4 to 10 bar, preferably 5 bar. After completion of curing, the vacuum foil 7 and the grid 14 are removed.

Figure 3:
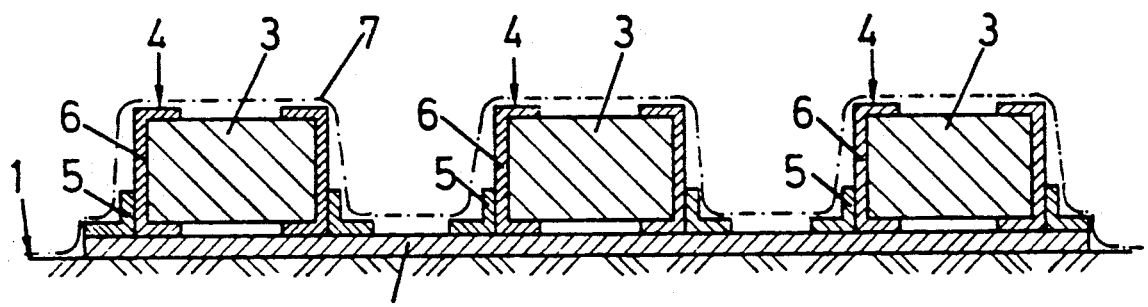
Figure 4:
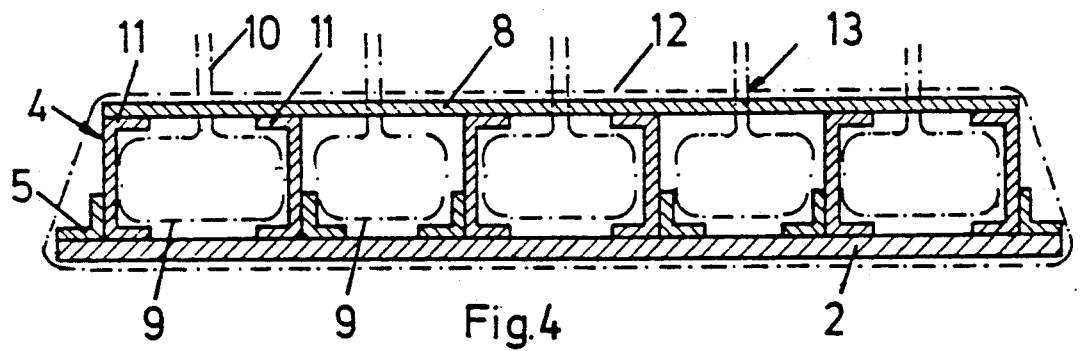

In FIG. 3, 1 denotes a large surface supporting surface, as in FIG. 1, the configuration of which in the longitudinal and transverse directions is adapted to the desired configuration of the cladding. In the illustrated example the supporting surface 1 is rectilinear in transverse direction whilst in the longitudinal direction it may for example be of circular arcuate shape. A base layer 2 of fibre reinforced curable synthetic resin is applied onto this supporting surface. The supporting surface 1 is coated with a suitable agent to avoid adhesion of the base layer 2. A U-profile 4 of fibre-reinforced curable synthetic resin is placed over a core 3 of rectangular cross section over both narrow sides. The core 3 is composed for example of aluminium and is similarly coated with a suitable agent to avoid adhesion of the profile 4 and to render the core 3 removable after this. In its longitudinal direction the configuration of the core 3 is adapted to the configuration of the supporting surface 1 in the longitudinal direction (normal to the plane of the drawing) of the latter. A plurality of the units thus formed comprising the core 3 as well as two U-profiles 4 is placed in spaced apart relationship onto the base layer 2. Thereafter one L-profile 5 each of fibre-reinforced curable reinforced synthetic resin is fitted along the transition between the base layer 2 and the base portion 6 of the U-profile 4. A vacuum foil 7 is applied over the structure thus formed and is adhesively bonded along the edges of the base layer 2 onto the supporting surface 1. The space between the vacuum foil 7 and the supporting surface 1 is subsequently evacuated. This is once again followed by complete curing in an autoclave at a temperature of 120° to 315° C., preferably 160°-282° C. and more preferably 170°-200° C. and at a pressure of 4 to 10 bar. After Curing, the vacuum foil 7 and the core 3 are removed.

As illustrated in FIG. 2, the fully cured complete component according to FIG. 3 (or FIG. 1) may be provided with a covering 8 of fibre-reinforced curable synthetic resin. Initially one rubber bag 9 each having an inlet nipple 10 is inserted into each cavity between the U-profiles 4, to project beyond the end of the component. Thereafter the covering 8 is applied onto the exposed limbs 11 of the U-profile 4. A vacuum foil 12 in the form of a bag is now drawn over the entire assembly such that the inlet nipples 10 project from the vacuum foil 12 and are adhesively sealed in an airtight manner in their regions of passage 13. The space between the vacuum foil 12 and the rubber bags 9 is now evacuated and complete curing of the covering 8 is conducted in an autoclave at the abovementioned temperatures and pressures, whilst pressure equilibration proceeds by way of the inlet nipples 10. After complete curing, the vacuum foil 12 and the rubber bags 9 are removed.

The aforegoing examples, read with the general description preceding it, will enable the person skilled in the art to practise all aspects of the invention.

The claims which follow are to be considered an integral part of the present disclosure. Reference numbers (directed to the drawings) shown in the claims serve to facilitate the correlation of integers of the claims, with illustrated features of certain preferred embodiments but are not intended to restrict in any way the language of the claims to what is shown in the drawings, unless the contrary is clearly apparent from the context.

What we claim is:

1. Process for manufacturing a cover for apertures of a fuselage of an aircraft, comprising:
    positioning a curable panel like base layer onto a supporting surface, such base layer having a configuration which in the longitudinal and transverse directions corresponds to the desired configuration of a covering for an aperture,
    positioning curable U-profiles, in a spaced apart mutually parallel configuration onto the base layer, such U-profiles having a base portion and two limbs, with one of said limbs contacting the base layer
    positioning curable L-profiles onto a side of the base portion of the U-profiles which faces away from the limbs,
    applying means for holding the U-profiles in position on the base layer,
    positioning a vacuum foil over the cover,
    adhesively bonding the foil along the edges of the base layer to the supporting surface,
    evacuating the space between the vacuum foil and the supporting surface,
    completely curing the fuselage cover at elevated temperature and pressure, and
    removing the vacuum foil and said means for holding.

2. Process according to claim 1, wherein after the production of the component a closed rubber bag having an inlet nipple is inserted into each of the spaces between the U-profiles, a covering layer of fibre-reinforced curable plastics is applied onto the limbs of the U-profiles not contacting the base layer and a vacuum foil in the form of a bag is drawn over the entire assembly, the inlet nipples projecting from the vacuum foil and being adhesively bonded thereto in an airtight manner in the region of contact, whereafter the space between the vacuum foil and the rubber bags is evacuated, and a complete curing of the covering layer takes place at elevated temperature and pressure followed by the removal of the vacuum foil and the rubber bags.

3. Process according to claim 1, wherein the curing takes place at a temperature of 120° to 315° C.

4. Process according to claim 3, wherein the temperature is between 160°-282° C.

5. Process according to claim 4, wherein the temperature is between 170°-200° C.

6. Process according to claim 3, wherein the temperature is about 300° C.

7. Process according to claim 1, wherein the curing takes place at a pressure of 4 to 10 bar.

8. Process according to claim 7, wherein the pressure is about 5 bar.

9. Process according to claim 5, wherein said means for holding include removable grid applied to the cover for holding the U-profiles and L-profiles together in position.

10. Process according to claim 5, wherein said means for holding include a removable core onto which the U-profiles are applied to form a unit which is positioned on the base layer.

* * * * *